US012703801B2

(12) United States Patent
Zweig et al.

(10) Patent No.: US 12,703,801 B2
(45) Date of Patent: Aug. 11, 2026

(54) CORROSION INHIBITION COATINGS WITH THIIRANE CROSSLINKERS AND METHODS THEREOF

(71) Applicant: The Boeing Company, Arlington, VA (US)

(72) Inventors: Andrew Michael Zweig, Akron, OH (US); Waynie Mark Schuette, Troy, IL (US); Ava Paloma Switzer, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 189 days.

(21) Appl. No.: 18/499,611

(22) Filed: Nov. 1, 2023

(65) Prior Publication Data

US 2025/0136824 A1 May 1, 2025

(51) Int. Cl.

| | |
|---|---|
| ***C09D 5/08*** | (2006.01) |
| ***B32B 7/12*** | (2006.01) |
| ***C08G 59/14*** | (2006.01) |
| ***C08G 59/24*** | (2006.01) |
| ***C09D 163/00*** | (2006.01) |

(52) U.S. Cl.

CPC ........... *C09D 5/08* (2013.01); *C08G 59/1483* (2013.01); *C08G 59/245* (2013.01); *C09D 163/00* (2013.01)

(58) Field of Classification Search

None

See application file for complete search history.

(56) References Cited

U.S. PATENT DOCUMENTS

| | | | |
|---|---|---|---|
| 11,713,374 B2 | 8/2023 | Zweig et al. | |
| 11,725,080 B2 | 8/2023 | Zweig et al. | |
| 2016/0289537 A1* | 10/2016 | Chen | E21B 43/27 |
| 2022/0288217 A1 | 9/2022 | Grembecka et al. | |

FOREIGN PATENT DOCUMENTS

| | | |
|---|---|---|
| CN | 104014315 A | 9/2014 |

OTHER PUBLICATIONS

Bouda et al., “Synthesis of Thiiranes from Epoxides in the Presence of Thiourea in a Weakly Hydrated Organic Medium,” Synthetic Communications: An International Journal for Rapid Communication of Synthetic Organic Chemistry, (1989) 19:3-4, 491-500.

Hagnauer, “HPLC and GPC Analysis of Epon 828 Epoxy Resins,” AMMRC TR 79-59, 1979, 22 pages.

Kazemi et al., Efficient Conversion of Epoxides to Episulfides with Thiourea Catalysed with Cerium (IV), J. Chem. Research (2), 2003, 290-291.

Extended European Search Report issued Mar. 24, 2025 in corresponding European Application No. 24182632.0, 10 pages.

* cited by examiner

*Primary Examiner* — Sheeba Ahmed

(74) *Attorney, Agent, or Firm* — MH2 Technology Law Group LLP

(57) ABSTRACT

A corrosion inhibitor coating composition includes a polymerized thiosemicarbazone, and a thiirane crosslinker, where the thiirane crosslinker is a difunctional molecule. The corrosion inhibitor coating composition can include where the thiirane crosslinker may include an aliphatic thiirane, a tri-functional thiirane, a bisphenol thiirane, or a combination thereof. The corrosion inhibitor coating composition can be metal-free and catalyst-free. An article utilizing and a method of preparing a corrosion inhibitor coating composition is also disclosed, which can include adding a thiourea to a difunctional epoxy terminated molecule in solution in the presence of a catalyst, converting the difunctional epoxy terminated molecule to a thiirane terminated difunctional molecule, and purifying the thiirane terminated difunctional molecule to produce a thiirane.

20 Claims, 2 Drawing Sheets

CORROSION INHIBITION COATINGS WITH THIIRANE CROSSLINKERS AND METHODS THEREOF

STATEMENT OF GOVERNMENT INTEREST

This invention was made with government support under contract number W912HQ21C0067 awarded by the U.S. ARMY CORE OF ENGINEERS (USACE). The government has certain rights in the invention.

TECHNICAL FIELD

The present teachings relate generally to corrosion inhibition coatings and, more particularly, to corrosion inhibition coatings including thiirane crosslinking.

BACKGROUND

The use of chromium-containing corrosion inhibitors has been widespread for decades because of its performance and durability with respect to the prevention of corrosion on steel, aluminum, and other alloys used in aerospace manufacturing. Recently, the use of chromium-containing corrosion inhibitors is being restricted by regulations on a global basis. New organic corrosion inhibitor molecules have been developed to replace the use of chromium for some applications. These organic corrosion inhibitor molecules require a reaction with a multi-functional resin to create a durable coating which contains these inhibitors. Due to the chemical structure of the organic corrosion inhibitor molecules, they do not react readily with epoxy resins typically used in coatings of this nature.

In embodiments, existing epoxy-based systems are not reactive enough with these organic-based corrosion inhibitor system molecules, and the reaction needed to cross-link does not proceed within the limits of possible application methods. Therefore, high temperature and long reaction times are necessary to achieve full reaction to provide adequate coating properties and adhesion.

Thus, there is a need for providing corrosion inhibition compositions having facile reactions that proceed within acceptable process limitations, while affording acceptable or improved adhesion and corrosion inhibition.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A corrosion inhibitor coating composition is disclosed, which includes a polymerized thiosemicarbazone, and a thiirane crosslinker, where the thiirane crosslinker is a difunctional molecule. Implementations of the corrosion inhibitor coating composition where the thiirane crosslinker may include an aliphatic thiirane, a tri-functional thiirane, a bisphenol thiirane, or a combination thereof. The corrosion inhibitor coating composition can include no metal. The corrosion inhibitor composition can include no catalyst. The thiirane is present in an amount of from about 0.1% to about 5.0% by total weight of the corrosion inhibitor coating composition.

An article including a substrate is disclosed, including a corrosion inhibitor coating composition disposed on a surface of the substrate, which can include a polymerized thiosemicarbazone, and a thiirane crosslinker, and where the thiirane crosslinker may include an aliphatic thiirane, a tri-functional thiirane, a bisphenol thiirane, or a combination thereof. Implementations of the article can include where the corrosion inhibitor coating composition can include no metal. The corrosion inhibitor composition can include no catalyst. A thickness of the corrosion inhibitor coating composition can be from about 100 nm to about 10 microns. The substrate can include a metal, polymer, polymer composite, or combination thereof. The substrate may include nickel plated steel. The substrate may include a transition metal. The article where no adhesive or primer is present between the substrate and the corrosion inhibitor coating composition. The article can be a component or part of an aerospace vehicle or a marine vehicle. The component or part of an aerospace vehicle or marine vehicle can be an external surface thereof.

A method of preparing a corrosion inhibitor coating composition is disclosed, which can include forming a solution including a polymerized thiosemicarbazone and a solvent, adding a thiirane crosslinker which can include a thiirane terminated difunctional molecule to the solution, and mixing the thiirane crosslinker and the solution. Implementations of the method of preparing a corrosion inhibitor coating composition may include adding a thiourea to a difunctional epoxy terminated molecule in solution in the presence of a catalyst, converting the difunctional epoxy terminated molecule to a thiirane terminated difunctional molecule, and purifying the thiirane terminated difunctional molecule, prior to adding the thiirane terminated difunctional molecule to the solution.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 1C is an exploded view of a structural component including a corrosion inhibition composition applied to an aerospace vehicle, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure provides corrosion inhibition compositions that incorporate epoxy resins with sulfur analogs instead of epoxy rings. These sulfur analogs are known as thiiranes or episulfides. The reactivity of the corrosion inhibition compositions is improved, which allows the coating to be cured faster and at lower temperature. This reduces the processing time, and lowers the per unit cost for each part. The corrosion inhibitors currently include a thioamide which is the component that reacts with the epoxy. The thioamide is a poor nucleophile towards epoxy ring-opening. The thiirane analog is more reactive than the corresponding epoxy. With the addition of a thiirane analog, this system cures faster. Another benefit is the ring-opening reaction step generates a secondary thiol group (analogous to epoxy ring-opening generating a secondary hydroxyl group) which can enhance adhesion to metal surfaces or other substrates.

Coating compositions of the present disclosure avoid the need for high temperature and prolonged heating time to initiate a reaction between the inhibitor system and crosslinking resin to proceed to complete curing. These compositions also avoid the need to add catalysts which could interfere with adhesion since catalysts are smaller molecules that remain in the coating after cure and can migrate or leach out during the lifetime of the coating.

Figure 1A:
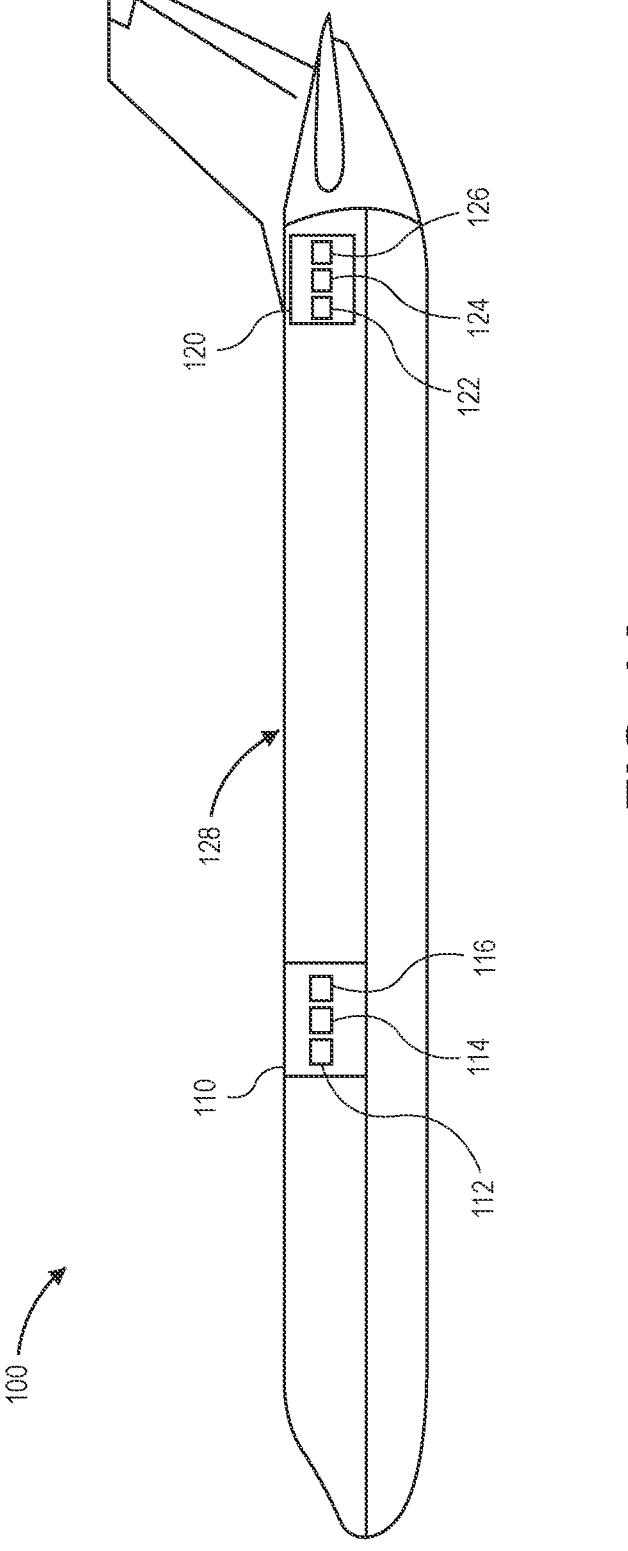
FIG. 1A illustrates a schematic view of a vehicle, in accordance with the present disclosure.

In some examples, a corrosion inhibitor coating composition or formulation can be applied to protect a substrate and other layers or portions of a vehicle 100 from the environment. FIG. 1A illustrates a schematic view of a vehicle 100, according to an implementation. As shown, the vehicle 100 may include an airplane. The vehicle 100 may also or instead include other types of aircrafts such as helicopters, unmanned aerial vehicles (UAVs), spacecrafts, marine crafts, or the like. In other implementations, the vehicle 100 may be or include a car, a boat, a train, or the like. In yet other implementations, the system and method described below may not be implemented in a vehicle, and rather may be implemented in a building. The vehicle 100 may include one or more lavatories (one is shown: 110). The lavatory 110 may include a sink 112, a toilet 114, and a sensor 116. The sensor 116 may sense/determine whether the lavatory 110 is occupied (e.g., by a passenger) or unoccupied. For example, the sensor 116 may be or include a motion sensor. The vehicle 100 may also include one or more kitchens or galleys (one is shown: 120). The kitchen 120 may include a sink 122, a dishwasher 124, and an ice maker 126. On one or more external surfaces or components of the vehicle 100, a corrosion inhibitor coating composition 128 may be applied to prevent or resist corrosion when exposed to a variety of harsh environmental conditions.

Figure 1B:
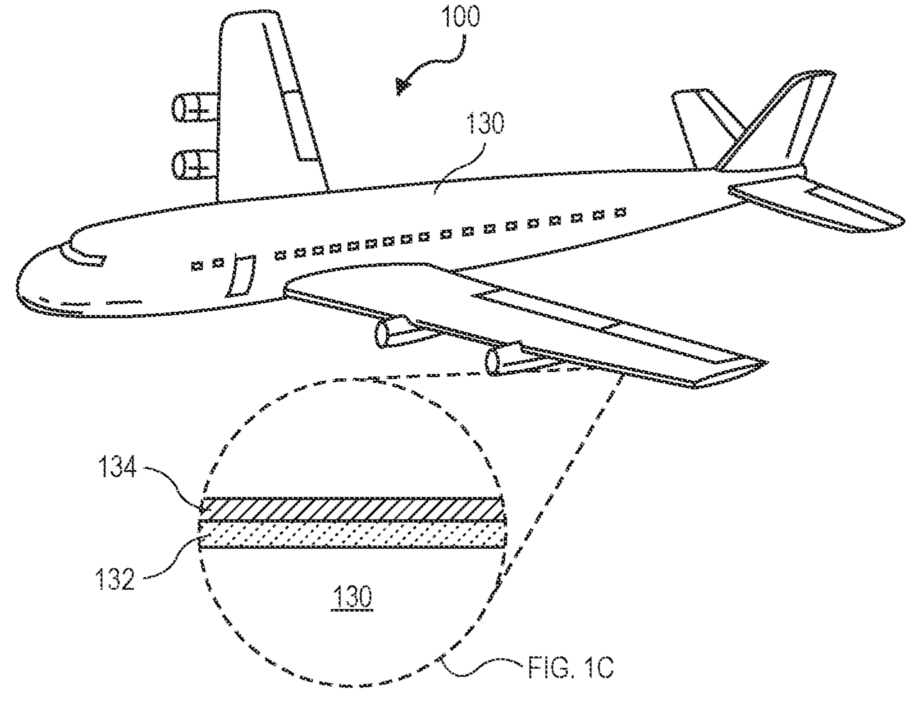
FIG. 1B depicts an application of a structural component including a corrosion inhibition composition applied to an aerospace vehicle, in accordance with the present disclosure.

FIG. 1B depicts an application of a structural component including a corrosion inhibition composition applied to an aerospace vehicle, in accordance with the present disclosure. An application of the presently disclosed coating composition or method is shown on an aerospace vehicle 100, whereby vehicle substrate 130 is applied with the presently disclosed coating composition. Exploded view 1C is shown having vehicle substrate surface 130 with substrate surface layer 132 and corrosion inhibitor coating composition layer 134 so as to impart corrosion resistance or inhibition to the surface of the substrate 130, and/or into a structural component of or a portion of a vehicle. In one example the application of the presently disclosed coating composition is directed to an external surface of the aerospace vehicle 100.

In examples, additional coating layers, such as paints, coatings, or other protective coatings can be applied upon the corrosion inhibitor coating composition layer 134.

A corrosion inhibitor coating composition of the present disclosure includes a polymerized thiosemicarbazone and a thiirane crosslinker, and wherein the thiirane crosslinker is a difunctional molecule. In examples, the polymerized thiosemicarbazone includes a thiosemicarbazone having the following structure:

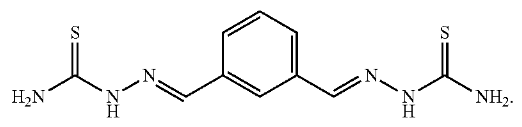 [SMILES: NC(=S)N/N=C/c1cccc(/C=N/NC(N)=S)c1]

The corrosion inhibitor coating composition can include where the thiirane crosslinker comprises a thiirane having the following structure:

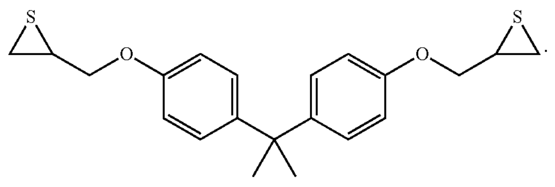 [SMILES: CC(C)(c1ccc(OCC2CS2)cc1)c1ccc(OCC2CS2)cc1]

In other examples, the thiirane crosslinker can include an aliphatic thiirane, a tri-functional thiirane, a bisphenol thiirane, or a combination thereof. The corrosion inhibitor coating composition, in examples, includes no metal, and substantially no presence of metal or metal-based compounds, resulting in a completely organic, metal free passivation or corrosion inhibition coating composition. In examples, the corrosion inhibitor composition includes no catalyst, as the thiirane crosslinker reacts in ideal or ambient environmental conditions without the use of a catalyst. In some examples, however, a catalyst may be used during some environmental conditions, or where it is desired to have a more accelerated crosslinking reaction during application or use of the corrosion inhibitor coating composition. In examples, the thiirane crosslinker is present in an amount of from about 0.1% to about 5.0% by total weight of the corrosion inhibitor coating composition.

An article or component, as described previously, can include a substrate, a corrosion inhibitor coating composition disposed on a surface of the substrate, which includes a polymerized thiosemicarbazone, and a thiirane crosslinker, wherein the thiirane crosslinker the thiirane crosslinker comprises an aliphatic thiirane, a tri-functional thiirane, a bisphenol thiirane, or a combination thereof. The composition of the corrosion inhibitor coating composition can include similar ingredients as described herein. In certain examples, the article includes a thickness of the corrosion inhibitor coating composition of from about 50 nm to about 1 micron, or from about 50 nm to about 500 nm, or from about 100 nm to about 10 microns. In examples, the article includes a substrate comprising a metal, a polymer, a polymer composite, or a combination thereof. In certain examples, the substrate includes nickel plated steel or a plating including one or more transition metals, including, but not limited to scandium, titanium, vanadium, chromium, manganese, iron, cobalt, nickel, copper, zinc, yttrium, zirconium, niobium, molybdenum, technetium, ruthenium, rhodium, palladium, silver, cadmium, or combinations thereof. In other examples, the article includes no adhesive or primer between the substrate and the corrosion inhibitor coating composition. The article can be or include a component or part of an aerospace vehicle or a marine vehicle, or the article can be or include an external surface thereof.

A method of preparing a corrosion inhibitor coating composition includes forming a solution comprising a polymerized thiosemicarbazone and a solvent, adding a thiirane crosslinker comprising a thiirane terminated difunctional molecule to the solution, and mixing the thiirane crosslinker and the solution. The method of preparing a corrosion inhibitor coating composition can further include an intermediate step of adding a thiourea to a difunctional epoxy terminated molecule in solution in the presence of a catalyst in order to prepare a thiirane by converting the difunctional epoxy terminated molecule to a thiirane terminated difunctional molecule, and purifying the thiirane terminated difunctional molecule, prior to adding the thiirane terminated difunctional molecule to the solution. Purification can be accomplished by drying, filtering, evaporating, rinsing, or any number of separatory procedures known by one skilled in the art.

A difunctional thiirane molecule is a chemical compound that contains two functional groups, identified as thiirane groups. A thiirane is a three-membered ring consisting of one sulfur atom and two R groups. The two R groups. R and R', represent different substituents or groups attached to the thiirane ring. Difunctional thiirane molecules can have various chemical properties and applications based on the specific substituents and the reactions they can undergo. Thiiranes are highly reactive substances and show characteristic properties different from alkyl and aryl sulfides lacking three-membered rings. The properties of thiiranes are also different from those of oxiranes, or three-membered rings containing an oxygen atom.

Examples of difunctional thiirane molecules include molecules based on difunctional, trifunctional, or tetra-functional thiiranes, as well as those based on acetophenone, phenolic-based, aniline-based resins. Any type of poly-epoxide could be converted at any level from having an epoxy group to having a thiirane group. Epoxy types include those based on triols like glycerol, or tris-hydroxyethyl tri-isocyanurate. A common tetra-ol is penta-erythritol. Other poly-ols include sugars (all types), i.e. simple saccharides (glucose, fructose etc.), di-saccchardies (e.g. sucrose), or poly-saccharides. Dextrins could also be utilized. Poly-ols derived from the condensation of phenol and ketones such as acetone provide Bis-phenol A. Others in this family include bisphenol F (from formaldehyde), bisphenol C (from cyclohexanone), 6F-bisphenol (from hexafluoroacetone), and the like. The phenol portion of the molecule can also be substituted such as 2,6-dimethylphenol, or just 2-methylphenol (which is also known as a cresol). The Ciba-Geigy MY 720 family of epoxies starting with MDA (methylene-dianiline) where the two $NH_2$ groups are reacted with excess epichlorohydrin to give a mixture of tri and tetra-epoxy derivatives can also be used for conversion to thiiranes. Possible uses and applications of difunctional thiirane molecules, in addition to their use as crosslinking agents, or use in the formation of bridges between polymer chains, as described herein, can include chemical synthesis, curing agents, chemical sensing applications, or pharmaceuticals.

Polymerized thiosemicarbazone molecules can be or include polymers or macromolecules that contain repeating units derived from thiosemicarbazone monomers. Thiosemicarbazone is a chemical compound characterized by the presence of a thiosemicarbazide (—$C(NH_2)(NHR)$—S—) functional group. Polymerization of thiosemicarbazone monomers involves the linking of these units together to form long chains or networks, resulting in polymeric materials. Applications of polymerized thiosemicarbazone molecules can be or include metal ion chelation, sensors, catalysis, drug delivery, antimicrobial materials, and the like.

The present teachings provide an approach to adding epoxy and catalysts to current corrosion inhibitor formulations based on thiosemicarbazones, and includes the use of a separate resin system, for example, sulfur analogs of the same epoxy system, that can react with the thioamides of the corrosion inhibitor formulation faster than with the original epoxy composition. This improvement allows for reduction in undesirable reactions, lower cure temperatures, and reduction of the need for catalysts. Typical catalysts, which can be avoided in using the present teachings, might include organo-tin compounds or small organics such as 2-ethyl-4-methylimidazole or other tertiary amines that could volatilize later leading to coating defects. These common amine catalysts also promote yellowing in some coatings. Compositions of corrosion inhibitors described herein eliminate this issue.

The use of a thiirane, as exemplified in the chemical formula below, instead of an epoxy is a key difference in the present teachings. The three-membered sulfur-containing ring has a lower energy barrier for ring opening, as compared to a similar molecule having an oxirane or epoxy ring.

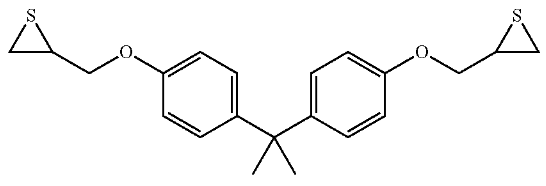 [SMILES: CC(C)(c1ccc(OCC2CS2)cc1)c1ccc(OCC2CS2)cc1]

Other methods to improve the reaction of an epoxy with some reactive species require higher temperature, longer reaction times, and the use of catalysts. These listed concepts have drawbacks that result in higher production costs, lower production rates, and higher cost of materials. The composition described herein can also be used in a formulation to coat metal parts. This composition can be applied by spray, dip, roller, or other methods known by one skilled in the art. The coated part can then be dried in a heated oven as a batch process or in a heated tunnel in a continuous process to cure the part and remove solvent. Components could be mixed on demand, depending on the coating equipment used. Corrosion inhibitor coatings of the present disclosure can be used on or applied to a wide range of similar metal surfaces, in addition to aerospace aluminum or steel. Other transportation vehicles, containers, and components from small parts to rail car or cargo ships could benefit from such coating compositions. The application of corrosion inhibitors can cost millions of dollars, both in materials, labor, but also disposal of exhausted or used coatings after stripping. Creating a more durable and effective coating reduces the frequency of maintenance cycles which results in less labor, reduced material going to landfills, and reduces the impact on the global environment. In some examples, a remote sensing method using a NIR (Near InfraRed) frequency device could be utilized to allow non-destructive sensing of coating attributes, such as thickness or coverage uniformity, from 10 to 20 meters away from the tested surface.

The coating compositions including oligomeric Schiff base corrosion inhibitors (thioamides) as described herein utilize an alternative approach to the use or inclusion of epoxy and catalysts, and includes use of a separate resin system, for example, sulfur analogs of the same epoxy system, that can react with the thioamides faster than with the original epoxy. While not wishing to be bound to any particular theory, this is believed to allow for reduction in undesirable reactions, lower cure temperatures, and reduction of the need for catalysts. Thio-rings open faster and ring opening can cause formation of a polymer. After ring opening, sulfur groups can bind and react well with metals and have better adhesion when used in coating compositions. As noted, the present system is believed to react more quickly and more completely than epoxy, but possesses similar physical properties and performance. Such coating compositions can be used in landing gear and other aerospace metals, and specifically, Zn—Ni surfaces, as well as others described herein.

Additional methods of forming or producing such oligomeric Schiff base corrosion inhibitors, also referred to as thioamides, thiosemicarbazones, or polymerized thiosemicarbazones may be found in U.S. Pat. Nos. 11,725,080, and 11,713,374, the disclosures of which are hereby incorporated by reference in their entirety. The present disclosure provides similar oligomer compositions using the thiirane resin or the thiirane crosslinker in the formation of continuous coatings, where the reactive species are combined with a multi-functional resin such as epoxy to form a good film with adhesion to a metal surface, providing a durable corrosion inhibition composition. In some examples without the use of thiirane crosslinkers, the thiosemicarbazones react sluggishly, and curing requires elevated temperature of up to 190° C. Previously known crosslinkers include difunctional epoxy molecules, such as diglycidyl bisphenol A, often called DGEBA. A typical structure is illustrated below:

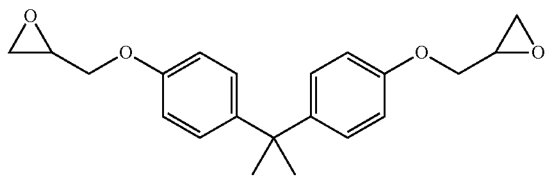 [SMILES: CC(C)(c1ccc(OCC2CO2)cc1)c1ccc(OCC2CO2)cc1]

The reactive end groups on corrosion inhibitor compositions of the present disclosures include, but are not limited to, thioamides. These thioamides, for example, have weak reactivity in a nucleophilic attack on the epoxy groups. In some previously considered approaches, the addition of a catalyst can be employed, often at levels up to 5 wt % of the solids portion of a coating composition. The catalyst used can be or include a small, mobile molecule that remains in the coating, which can later migrate or leach out of the coating over time and during service. This catalyst migration can create defects in the coating, thereby compromising the integrity of the coating. While examples of the present coating compositions are catalyst-free, some level of catalyst may alternatively be used in some examples. In other examples, an adhesive can be used in combination with coatings of the present disclosure or as a prior process step to applying a coating composition of the present disclosure. In still other examples, the coating compositions can be applied primerless, or without the use of a primer.

An alternative approach is to use another resin system that can react with thioamides faster than an epoxy-functional material. The present disclosure provides sulfur analogs of epoxy systems, such as shown in the schematics shown below.

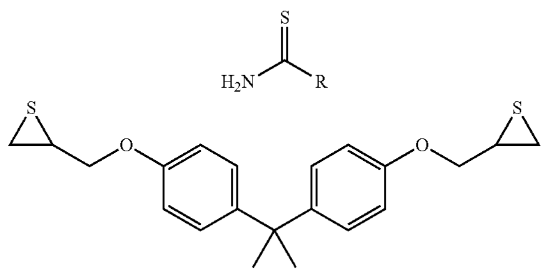

The energy barrier to ring-opening of the thiirane is lower than that of any corresponding epoxy. It is this difference that is exploited to provide a coating that cures at lower temperature to provide a coating formulation with less tackiness, with less or no use of catalysts, and can provide improved adhesion. Furthermore, the present disclosure provides methods to convert epoxy-functional molecules to produce corresponding thiiranes using sulfur donors such as thiourea or potassium thiocyanate. The reagents can be thiourea or potassium thiocyanate, both readily available and inexpensive. Reaction conditions depend on the system but can be accomplished by stirring at room temperature, 25° C., for example, for a few hours at reflux. The solvents used can be acetonitrile or mixtures of water and ethanol, as exemplary examples. All of these are common laboratory reagents and require only a routine level of safety procedures when used in laboratory or industrial settings.

In examples, the synthesis of thiiranes from epoxides using thiourea as a reagent in the presence or absence of ethanol as a solvent have been demonstrated. In the absence of ethanol, only certain aromatic or heteroaromatic epoxides react with thiourea, yielding lower yields of thiiranes compared to procedures including the use of potassium thiocyanate (KSCN). The reaction using KSCN is exothermic and may lead to the formation of alkenes in some cases. With the presence of weakly hydrated ethanol, the reactivity of thiourea becomes similar to that of KSCN, and alkenes are not formed from furanic epoxides. By these methods, aliphatic and cyclic epoxides can be efficiently converted into thiiranes with high yields. Various solvents can differentially influence the reaction outcomes, with stable epoxides producing improved results. The presence of ethanol, in some examples, can stabilize certain epoxides, preventing desulfuration and favoring thiirane formation.

Substrates for Corrosion Protection

Substrates that may be protected from corrosion by a corrosion inhibitor coating composition, including a Schiff base oligomer or composition thereof may be any suitable substrate, such as a metal substrate or plastic substrate. The metal substrate can include any substrate material having at least a portion of its surface being metallic, for example a portion of its external surface being metallic. The metal substrate may comprise any metal requiring protection from corrosion. The metal substrate may include a metal or alloy selected from aluminum, for example aluminum alloys. The metal substrate may be an aluminum alloy, for example alloys of aluminum with one or more metals selected from the group consisting of copper, magnesium, manganese, silicon, tin, zinc, and combinations thereof. An aluminum alloy may be an alloy comprising copper. The metal substrate may be a copper-containing alloy, such as copper-containing aluminum alloy. The amount of copper in the alloy may be about 1 wt % to about 20 wt %, about 1 wt % to about 18 wt %, about 1 wt % to about 10 wt %, or about 1 wt % to about 6 wt %. The aluminum alloy may be an aerospace alloy, for example AA2XXX and AA7XXX type. For example, the aluminum alloy may be AA2024 and AA7075 type. The aluminum alloy may be an automotive alloy, for example AA6XXX type. The aluminum alloy may be a marine alloy, for example AA5XXX type. In examples, a surface metal, such as one found in a coating or plating, may be composed of one or more of the preceding compositions.

In other substrate examples, metals such as nickel-plated steel, other nickel-plated metals, cadmium plated metals, or zinc plated metals, or combinations of any of the described substrate materials can be used. Other transition metal plated metals or other surfaces can be suitable substrates as well. Other examples of suitable substrates can include titanium, aluminum, epoxy, or composite panel materials comprising metals which would be subject to corrosion or require passivation coating in the absence of such coating compositions as described herein.

Compositions

Compositions of the present disclosure may further include a solvent to provide solubility/dispersibility of the Schiff base oligomer. Solvents may be water, a glycol, or a ketone. Glycols can include glycol acetates, such as glycol ether acetates. Ketones can include acetone or pentanones. In some aspects, a solvent can include 1-methoxy-2-propanol acetate, 4-methyl-2-pentanone, acetone, butoxyethanol, dimethyl carbamate, or combinations thereof.

The concentration of the Schiff base oligomer may be about 0.001 wt % to about 20 wt %, such as about 0.1 wt % to about 10 wt %, such as about 1 wt % to about 5 wt %, alternatively about 5 wt % to about 10 wt %, all by weight of total solids and which can provide solubility/dispersibility of the Schiff base oligomer.

In some aspects, the molar ratio of metal(s) (e.g., metal salt(s):Schiff base oligomer(s) in a composition is provided with an excess of the metal (e.g., metal salt) in comparison to the Schiff base oligomer, due to the presence of multiple moieties of the Schiff base oligomer that are capable of interacting with a metal. For example, the molar ratio of metal salt:Schiff base oligomer in the composition may be greater than about 1:1, greater than about 1.1:1, greater than about 1.2:1, greater than about 1.3:1, greater than about 1.4:1, greater than about 1.5:1, greater than about 1.6:1, greater than about 1.7:1, greater than about 1.8:1, greater than about 1.9:1, greater than about 2:1, greater than about 3:1, greater than about 4:1, greater than about 5:1, greater than about 6:1, greater than about 7:1, greater than about 8:1, greater than about 9:1, or greater than about 10:1. The ratio of metal salt:Schiff base oligomer in the composition may be less than about 45:1, less than about 40:1, less than about 35:1, less than about 30:1, less than about 25:1, less than about 20:1, less than about 15:1, or less than about 10:1. The ratio of metal: corrosion inhibiting agent in the composition may be greater than about 1:1 to about 45:1, about 1.5:1 to about 40:1, about 2:1 to about 35:1, about 2.5:1 to about 30:1, about 3:1 to about 25:1, about 3.5:1 to about 20:1, about 4:1 to about 15:1, or about 5:1 to about 10:1. For example, the ratio of metal: corrosion inhibiting agent in the composition may be about 1.1:1 to about 45:1, about 1.2:1 to about 40:1, about 1.3:1 to about 35:1, about 1.4:1 to about 30:1, about 1.5:1 to about 25:1, about 1.6:1 to about 20:1, about 1.7:1 to about 15:1, about 1.8:1 to about 10:1, about 1.9:1 to about 9:1, or about 2:1 to about 8:1. In examples provided herein, the compositions of the present disclosure are metal-free, or substantially metal-free.

The corrosion inhibitor compositions are suitable for use and application to various substrates, such as metal substrates, and for example can be provided as coating compositions. The compositions may include one or more other additives or corrosion inhibiting agents suitable for use with a substrate of interest.

After depositing a composition onto a substrate, the solvent (if used) can be partially, substantially, or completely removed by any suitable curing process. For example, a coating composition can be applied to a substrate, in either a wet or "not fully cured" condition that dries or cures over time, that is, solvent evaporates. The coatings can dry or cure either at ambient temperature or by accelerated means, for example an ultraviolet light cured system to form a film or "cured" paint. The coatings can also be applied in a semi or fully cured state, such as an adhesive.

The composition can be a coating composition comprising a film-forming organic polymer. The coating composition may be a paint composition. The coating composition may comprise one or more resins, for example epoxy based resins. The coating composition may be a paint composition, for example an epoxy resin-based paint composition.

The coating composition may be a powder coating composition, for example a powder coating composition suitable for use in powder coating of various metal substrates including aluminum alloys as described herein or steels.

Compositions of the present disclosure can include one or more additives, such as pigments, fillers and extenders. Examples of suitable additives with which the corrosion inhibitors described herein can be combined include, for example, binders, solvents, pigments (including soluble or non-soluble extenders, fillers, corrosion-inhibiting pigments, and the like), additives (e.g., curing agents, surfactants, dyes, amino acids and the like), and so forth. Note that some additives can also properly be considered a pigment and vice versa (e.g., matting agents). More specifically, these "additives" include, but are not limited to, glycine, arginine, methionine, and derivatives of amino acids, such as methionine sulfoxide, methyl sulfoxide, and iodides/iodates, gelatin and gelatin derivatives, such as animal and fish gelatins, linear and cyclic dextrins, including alpha and beta cyclodextrin, triflic acid, triflates, acetates, talc, kaolin, organic-based ionic exchange resins, such as organic-based cationic and anionic exchange resins, organic-based ionic exchange resins that have been pre-exchanged or reacted with salts, oxides, and/or mixed oxides of rare earth material, and/or metal sulfates, such as sulfates of rare earth materials, magnesium sulfate, calcium sulfate (anhydrous and hydrated forms), strontium sulfate, barium sulfate, and the like, and combinations thereof.

Compositions may also include other additives such as rheology modifiers, fillers, tougheners, thermal or UV stabilizers, fire retardants, lubricants, surface active agents. The additive(s) are usually present in an amount of less than about 10% based on the total weight of the composition after curing. Examples include:

(a) rheology modifiers such as hydroxypropyl methyl cellulose (e.g. Methocell 311, Dow), modified urea (e.g. BYK 411, 410) and polyhydroxycarboxylic acid amides (e.g. Byk 405);

(b) film formers such as esters of dicarboxylic acid (e.g. Lusolvan FBH, BASF) and glycol ethers (e.g. Dowanol, Dow);

(c) wetting agents such as fluorochemical surfactants (e.g. 3M Fluorad) and polyether modified poly-dimethyl-siloxane (e.g. Byk 307, 333);

(d) surfactants such as fatty acid derivatives (e.g. Bermadol SPS 2543, Akzo) and quaternary ammonium salts;

(e) dispersants such as non-ionic surfactants based on primary alcohols (e.g. Merpol 4481, Dupont) and alkylphenol-formaldehyde-bisulfide condensates (e.g. Clariants 1494);

(f) anti foaming agents;

(g) anti corrosion reagents such as phosphate esters (e.g. ADD APT, Anticor C6), alkylammonium salt of (2-benzothiazolythio) succinic acid (e.g. Irgacor 153 CIBA) and triazine dithiols;

(h) stabilizers such as benzimidazole derivatives (e.g. Bayer, Preventol BCM, biocidal film protection);

(i) leveling agents such as fluorocarbon-modified polymers (e.g. EFKA 3777);

(j) pigments or dyes such as fluorescents (Royale Pigment and chemicals);

(k) organic and inorganic dyes such as fluoroscein; and (l) Lewis acids such as lithium chloride, zinc chloride, strontium chloride, calcium chloride and aluminum chloride.

(m) Suitable flame retardants which retard flame propagation, heat release and/or smoke generation which may optionally include any of the following (or combinations thereof):

EXAMPLES

Epoxy to Thiirane Reaction Mechanism:

| Chemical | CAS # | Molecular weight (g/mol)/ EEW | Number of moles (mmol) | Actual mass or volume |
|---|---|---|---|---|
| Cerium ammonium nitrate (CAN) | 16774-21-3 | 220.16 | 0.2 | 0.110 g |
| *Chloroform | 67-66-3 | 119.38 | | 10 mL |
| Thiourea | 62-56-6 | 76.12 | 2 | 0.152 g |
| Acetonitrile | 75-05-8 | 41.05 | | 5 mL |
| Epon828 | N/A | 185-192 g/eq | c. 1 mmol | 0.1855 g |

*Used for extraction

Mechanism:

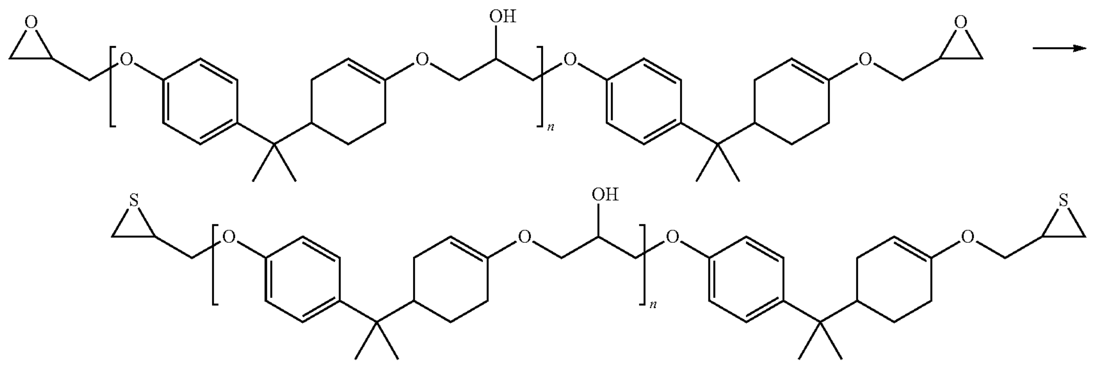

Phosphorus derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine.

Nitrogen containing derivatives such as melamine, melamine cyanurate, melamine phthalate, melamine phthalimide, melam cyanurate, melem cyanurate, melon cyanurate, hexamethylene tetraamine, imidazole, adenine, guanine, cytosine and thymine.

Molecules containing borate functional groups such as ammonia borate and zinc borate.

Molecules containing two or more alcohol groups such as pentaerythritol, polyethylene alcohol, polyglycols and carbohydrates, for example, glucose, sucrose and starch.

Molecules which endothermically release non-combustible decomposition gases, such as, metal hydroxides, for example, magnesium hydroxide and aluminum hydroxide.

Expandable graphite.

Procedure:

1. In a 25 mL round bottom flask under stirring, add EPON828, 5 mL of acetonitrile, and 0.152 g of thiourea. In the example mechanisms shown herein, n refers to a number of repeat units of the designated structure representing the EPON828 material, and should be understood to be a non-limiting example of a conversion of an epoxide to a thiirane. In the non-limiting examples described herein, an average repeat unit is understood to be n=0.2.
2. Then, add 0.110 g of cerium ammonium nitrate under stirring and reflux. Monitor the reaction progress using TLC.
3. To extract, prepare a mixture of 10 mL of water and 10 mL of chloroform. Use separatory funnel.
4. Product should go into chloroform phase, separate and rotovap chloroform to extract product. The use of a drying agent, such as anhydrous magnesium sulfate, on the chloroform solution, can be added, then filtered prior to removal of the chloroform.
5. Repeat extraction process three times.

Reaction of Thiirane with Schiff Base:

| | EXP 38 | Moles | Weight (gm) |
|---|---|---|---|
| Inhibitor | Thiosemicarbazone of isophthalaldehyde | 0.005 | 1.4 |
| Polymer | Thiirane | | 3.7 |
| Catalyst | DMP-30 | 0.000052 | 0.014 |
| Solvent | DMF | | 5 |
| | MIBK | | 7 |

Mechanism:

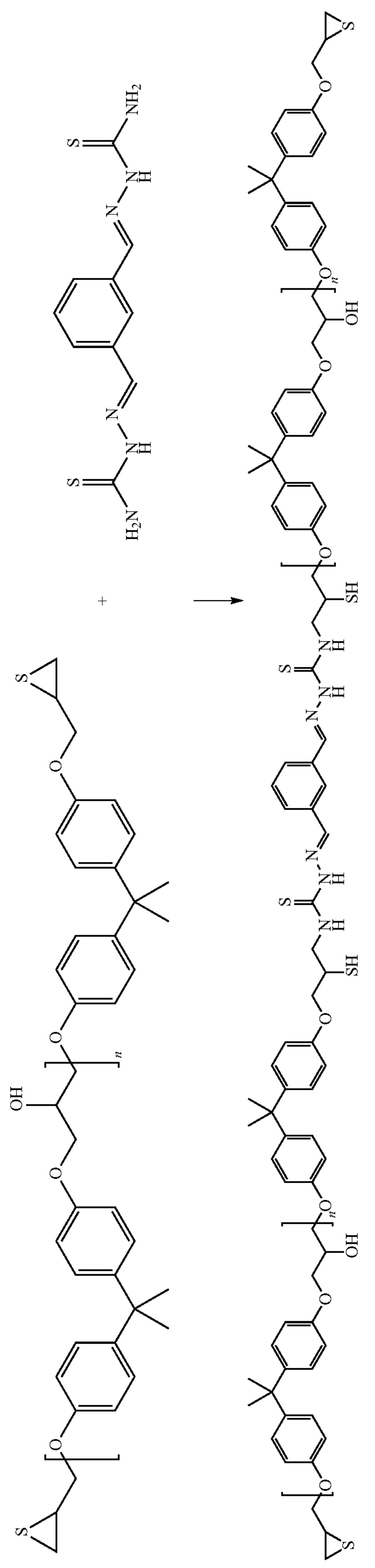

Procedure:

A 100 mL three-necked round-bottom flask with side-neck fitted with thermometer is charged with thiirane polymer (3.7). A PTFE stirring bar is added, and the flask is placed on a magnetic stirrer. Add 5.0 mL of MIBK and start stirring. In 50 mL beaker take inhibitor (1.4 g, 0.005 mole) and dissolve it in 4 mL DMF. Add inhibitor solution to flask dropwise under stirring. Reaction mixture turned yellow as soon as addition of inhibitor soln. Rinse beaker with another 1.0 mL DMF and add to flask. Add solution of catalyst DMP-30 (0.014 g, 0.000052 mole) and 2.0 mL MIBK to flask and continue stirring for 3 hours at room temperature.

Four active hydrogen from two —NH2 groups of inhibitors were considered to be participating in Thiirane ring opening reaction.

Catalyst—1% of inhibitor molar concentration.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A corrosion inhibitor coating composition, comprising:

a polymerized thiosemicarbazone; and a thiirane crosslinker; and wherein the thiirane crosslinker is a difunctional molecule.

2. The corrosion inhibitor coating composition of claim 1, wherein the polymerized thiosemicarbazone comprises a thiosemicarbazone having the following structure:

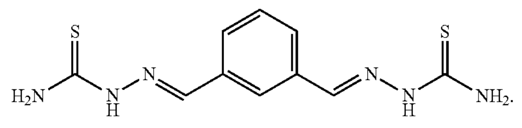 [SMILES: NC(=S)N/N=C/c1cccc(/C=N/NC(N)=S)c1]

3. The corrosion inhibitor coating composition of claim 1, wherein the thiirane crosslinker comprises a thiirane having the following structure:

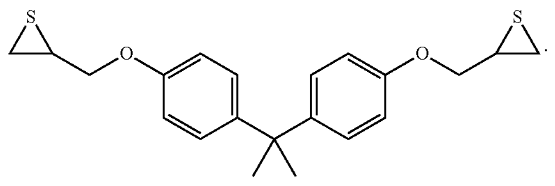 [SMILES: CC(C)(c1ccc(OCC2CS2)cc1)c1ccc(OCC2CS2)cc1]

4. The corrosion inhibitor coating composition of claim 1, wherein the thiirane crosslinker comprises an aliphatic thiirane, a tri-functional thiirane, a bisphenol thiirane, or a combination thereof.

5. The corrosion inhibitor coating composition of claim 1, wherein the corrosion inhibitor coating composition comprises no metal.

6. The corrosion inhibitor coating composition of claim 1, wherein the corrosion inhibitor composition comprises no catalyst.

7. The corrosion inhibitor coating composition of claim 1, wherein the thiirane is present in an amount of from about 0.1% to about 5.0% by total weight of the corrosion inhibitor coating composition.

8. An article, comprising:

a substrate;

a corrosion inhibitor coating composition disposed on a surface of the substrate, comprising:

a polymerized thiosemicarbazone; and a thiirane crosslinker; and wherein the thiirane crosslinker comprises an aliphatic thiirane, a tri-functional thiirane, a bisphenol thiirane, or a combination thereof.

9. The article of claim 8, wherein the polymerized thiosemicarbazone comprises a thiosemicarbazone having the following structure:

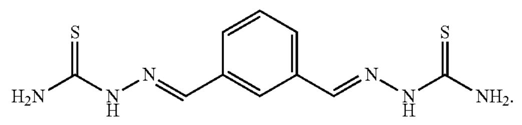 [SMILES: NC(=S)N/N=C/c1cccc(/C=N/NC(N)=S)c1]

10. The article of claim 8, wherein the corrosion inhibitor coating composition comprises no metal.

11. The article of claim 8, wherein the corrosion inhibitor composition comprises no catalyst.

12. The article of claim 8, wherein a thickness of the corrosion inhibitor coating composition is from about 100 nm to about 10 microns.

13. The article of claim 8, wherein the substrate comprises a metal, polymer, polymer composite, or combination thereof.

14. The article of claim 8, wherein the substrate comprises nickel plated steel.

15. The article of claim 8, wherein the substrate comprises a transition metal.

16. The article of claim 8, where no adhesive or primer is present between the substrate and the corrosion inhibitor coating composition.

17. The article of claim 8, wherein the article is a component or part of an aerospace vehicle or a marine vehicle.

18. The article of claim 17, wherein the component or part of an aerospace vehicle or marine vehicle is an external surface thereof.

19. A method of preparing a corrosion inhibitor coating composition, comprising:

forming a solution comprising a polymerized thiosemicarbazone and a solvent;

adding a thiirane crosslinker comprising a thiirane terminated difunctional molecule to the solution; and mixing the thiirane crosslinker and the solution.

20. The method of preparing a corrosion inhibitor coating composition of claim 19, further comprising:

adding a thiourea to a difunctional epoxy terminated molecule in solution in the presence of a catalyst;

converting the difunctional epoxy terminated molecule to a thiirane terminated difunctional molecule; and purifying the thiirane terminated difunctional molecule, prior to adding the thiirane terminated difunctional molecule to the solution.

* * * * *